(12) United States Patent
Rodriguez et al.

(10) Patent No.: US 8,804,031 B2
(45) Date of Patent: *Aug. 12, 2014

(54) MULTIPOSITION HANDHELD ELECTRONIC MAGNIFIER

(75) Inventors: Carlos Rodriguez, Palm Harbor, FL (US); Patrick Murphy, Riverview, FL (US); Waldemar Tunkis, Palm Harbor, FL (US); Todd Conard, Ruskin, FL (US); Michael Goldenberg, Melbourne Beach, FL (US); Jeffrey McDaniel, Largo, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,204

(22) Filed: Aug. 13, 2012

(65) Prior Publication Data

US 2012/0307026 A1    Dec. 6, 2012

Related U.S. Application Data

(63) Continuation of application No. 12/478,993, filed on Jun. 5, 2009, now Pat. No. 8,264,598, which is a continuation-in-part of application No. 12/235,182, filed on Sep. 22, 2008, now Pat. No. 8,259,222.

(60) Provisional application No. 61/085,966, filed on Aug. 4, 2008.

(51) Int. Cl.
  *H04N 5/225*    (2006.01)
(52) U.S. Cl.
  USPC .......................................................... 348/373

(58) Field of Classification Search
  USPC .......................................................... 348/373
  See application file for complete search history.

(56) References Cited

U.S. PATENT DOCUMENTS

| | | |
|---|---|---|
| 3,252,067 A | 5/1966 | Derenbecher, Jr. |
| 3,253,529 A | 5/1966 | Fahlenberg |
| 3,850,523 A | 11/1974 | Skavnak |
| 4,362,806 A | 12/1982 | Whitmore |
| 4,456,931 A | 6/1984 | Toyoda et al. |
| 4,799,049 A | 1/1989 | Avila |
| 5,335,192 A | 8/1994 | Oshiba |
| 5,633,674 A | 5/1997 | Trulaske et al. |
| 5,703,661 A | 12/1997 | Wu |
| 5,717,964 A | 2/1998 | Dowe |
| 5,739,859 A | 4/1998 | Hattori et al. |
| 5,748,228 A | 5/1998 | Kobayashi et al. |
| 5,815,735 A | 9/1998 | Baker |
| 5,893,651 A | 4/1999 | Sakamoto |
| D454,146 S | 3/2002 | Mori |

(Continued)

FOREIGN PATENT DOCUMENTS

| | | |
|---|---|---|
| EP | 1921838 A2 | 5/2008 |
| GB | 2403370 A | 12/2004 |
| JP | 2003051971 A | 2/2003 |

*Primary Examiner* — James Hannett
(74) *Attorney, Agent, or Firm* — GrayRobinson, P.A.; Michael J. Colitz, III

(57) ABSTRACT

Disclosed is a magnifier for use by blind or low vision users. The magnifier includes a camera, such as a CMOS image sensor, that displays enlarged images upon a screen for easy viewing. The magnifier further includes a handle that is pivotally interconnected to a housing to allow for handheld use in a variety of different configurations.

10 Claims, 5 Drawing Sheets

(56) References Cited

U.S. PATENT DOCUMENTS

| | | |
|---|---|---|
| 6,636,359 B2 | 10/2003 | Travers et al. |
| 6,642,505 B1 | 11/2003 | Nakano et al. |
| D488,440 S | 4/2004 | Senda |
| 6,767,107 B1 | 7/2004 | Leifer et al. |
| 6,809,741 B1 | 10/2004 | Bates et al. |
| D503,944 S | 4/2005 | Adachi et al. |
| 6,956,616 B2 | 10/2005 | Jung et al. |
| 6,971,600 B2 | 12/2005 | Cheung |
| 6,977,676 B1 | 12/2005 | Sato et al. |
| 7,106,357 B2 * | 9/2006 | Fukuda et al. ............. 348/14.02 |
| 7,119,319 B2 | 10/2006 | Noto et al. |
| 7,170,557 B2 | 1/2007 | Manico et al. |
| 7,172,304 B2 | 2/2007 | Rodriguez et al. |
| 7,172,305 B2 | 2/2007 | Rodriguez et al. |
| 7,295,244 B2 | 11/2007 | Manico et al. |
| 7,336,295 B2 | 2/2008 | Sukenari et al. |
| D614,220 S | 4/2010 | Goldenberg |
| 8,115,831 B2 | 2/2012 | Rodriguez et al. |
| 8,264,598 B2 * | 9/2012 | Rodriguez et al. ............ 348/373 |
| 2001/0002850 A1 | 6/2001 | Slatter |
| 2002/0063791 A1 | 5/2002 | Waterman et al. |
| 2002/0071047 A1 | 6/2002 | Strong et al. |
| 2003/0040346 A1 * | 2/2003 | Fukuda et al. ................ 455/575 |
| 2003/0063214 A1 | 4/2003 | Van Hees |
| 2003/0210340 A1 | 11/2003 | Romanowich |
| 2004/0141062 A1 | 7/2004 | Pilu et al. |
| 2004/0246340 A1 | 12/2004 | Sukenari et al. |
| 2005/0141099 A1 | 6/2005 | Bang et al. |
| 2005/0162512 A1 | 7/2005 | Seakins |
| 2006/0018508 A1 | 1/2006 | Monk et al. |
| 2006/0034601 A1 | 2/2006 | Andersson et al. |
| 2006/0158427 A1 | 7/2006 | Goldenberg et al. |
| 2006/0268569 A1 | 11/2006 | Rodriguez et al. |
| 2007/0018919 A1 | 1/2007 | Zavracky et al. |
| 2007/0040907 A1 | 2/2007 | Kern et al. |
| 2007/0223906 A1 | 9/2007 | Hanney et al. |
| 2007/0263014 A1 | 11/2007 | Ketola et al. |
| 2007/0273708 A1 | 11/2007 | Andreasson et al. |
| 2007/0296845 A1 | 12/2007 | Watanabe et al. |
| 2008/0165141 A1 | 7/2008 | Christie |
| 2009/0059038 A1 | 3/2009 | Seakins et al. |
| 2009/0160996 A1 | 6/2009 | Yamaoka et al. |
| 2010/0026854 A1 | 2/2010 | Rodriguez et al. |
| 2010/0026855 A1 | 2/2010 | Conard et al. |
| 2010/0073545 A1 | 3/2010 | Rodriguez et al. |

* cited by examiner

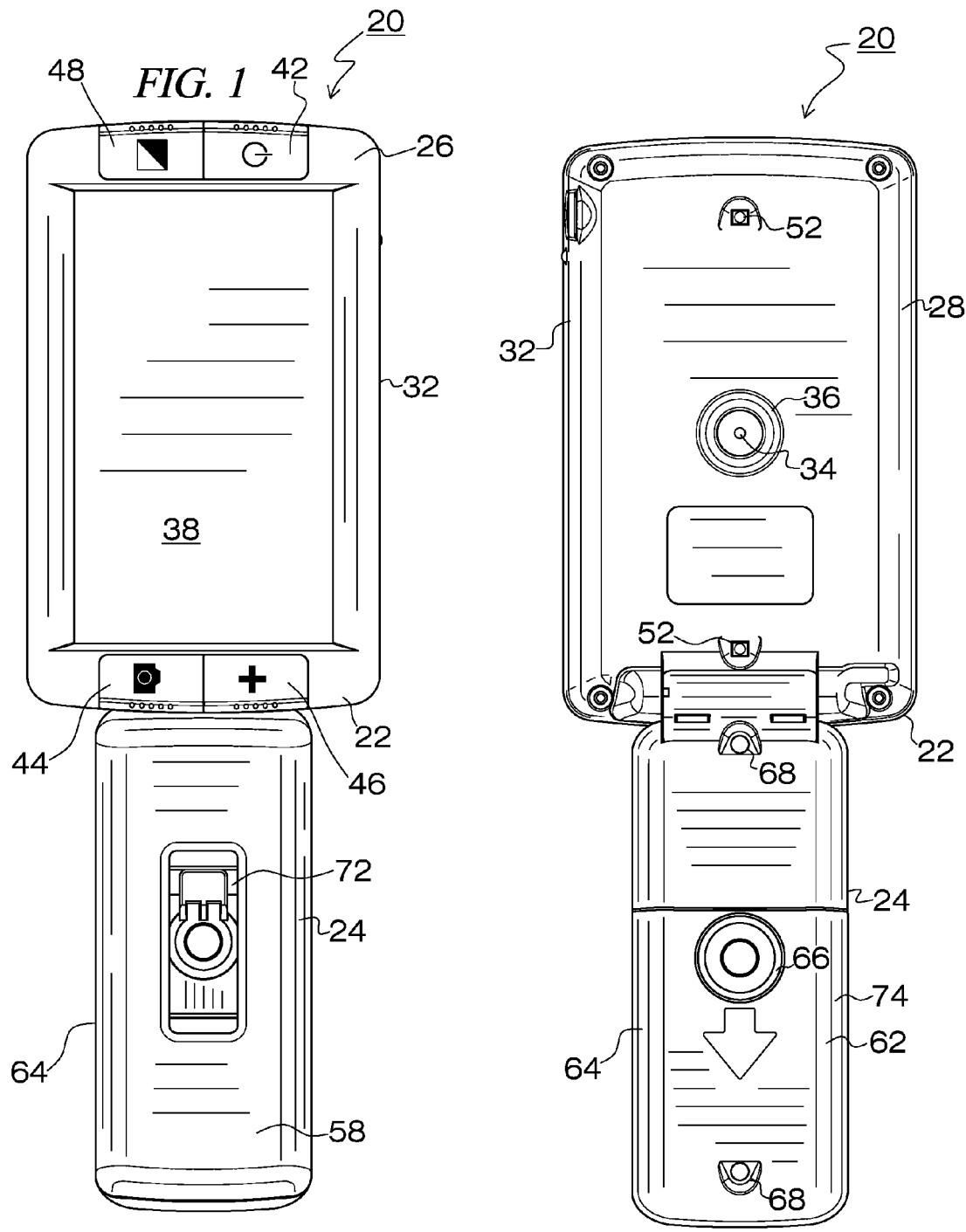

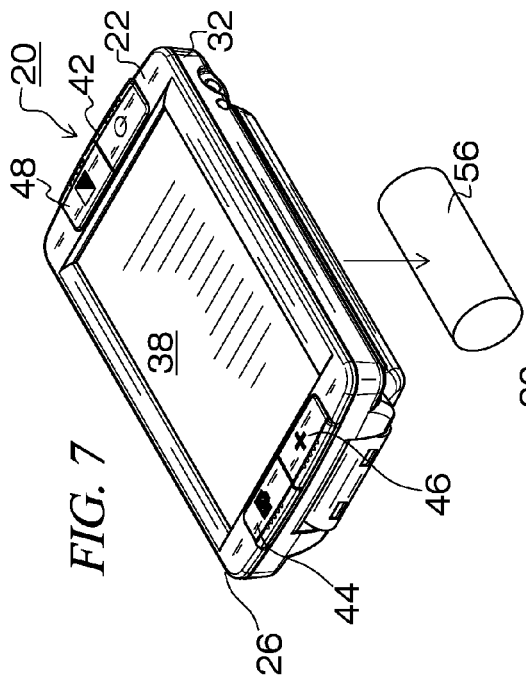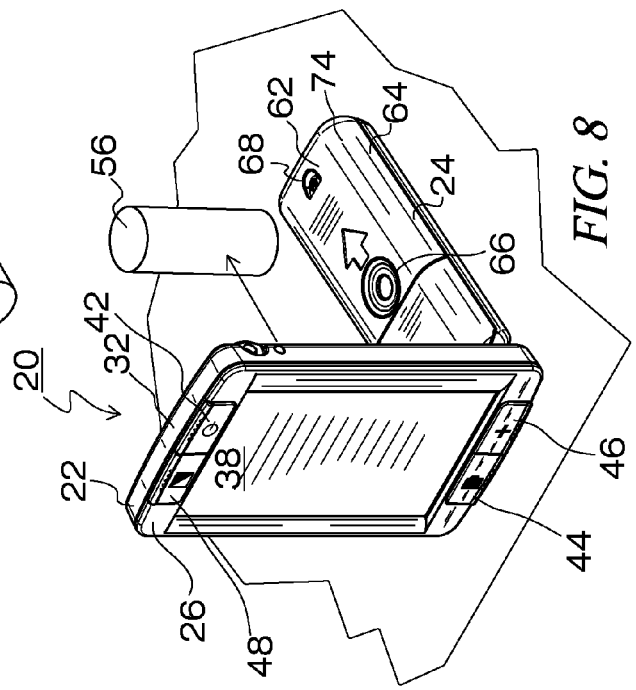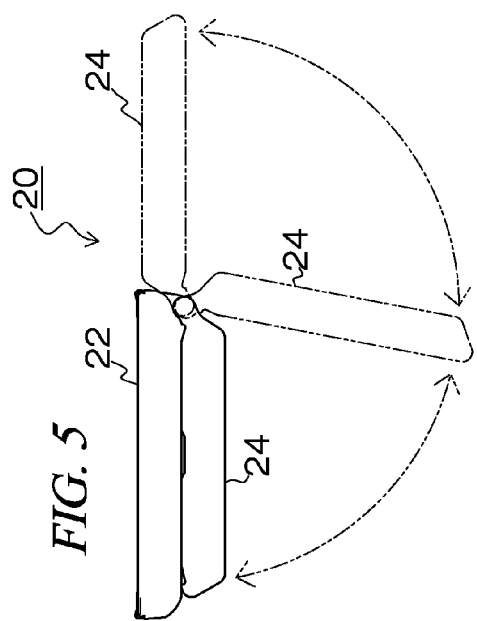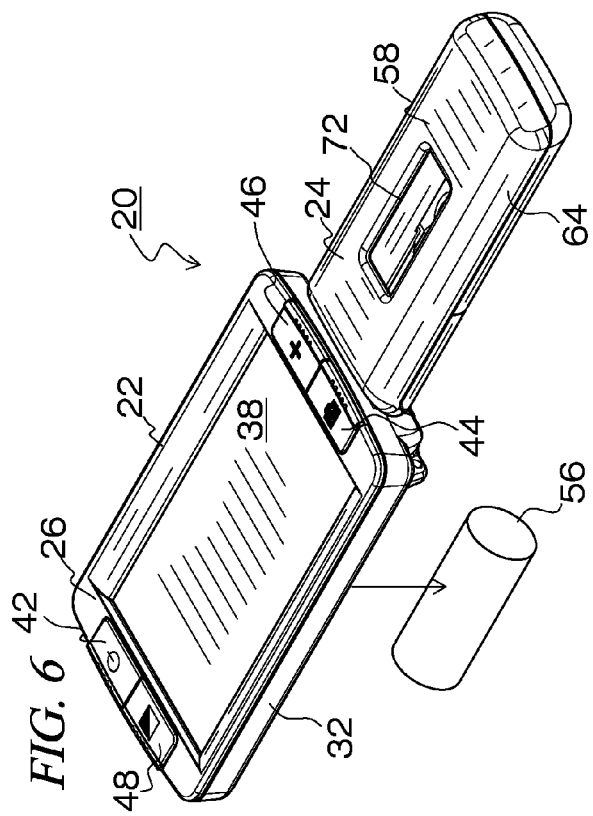

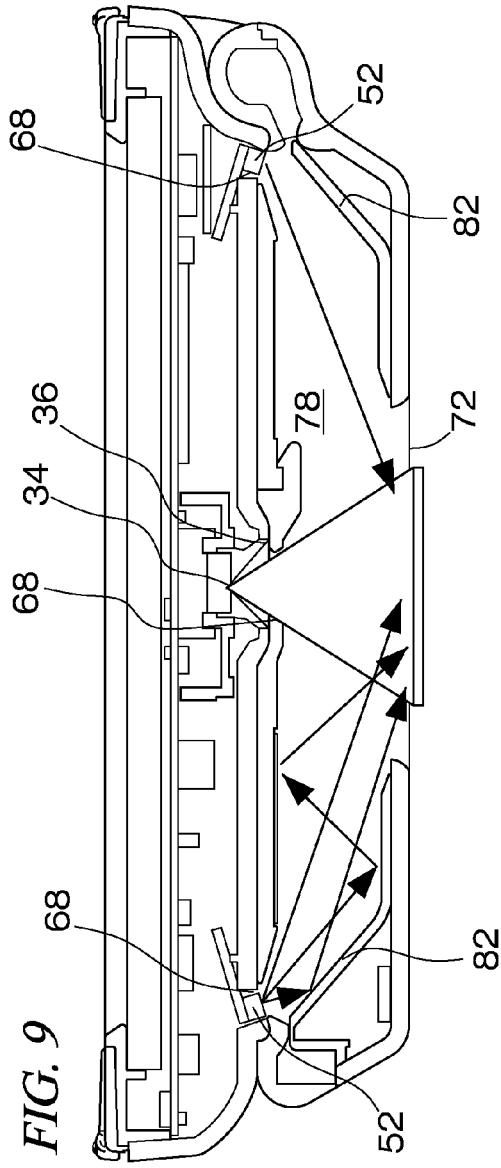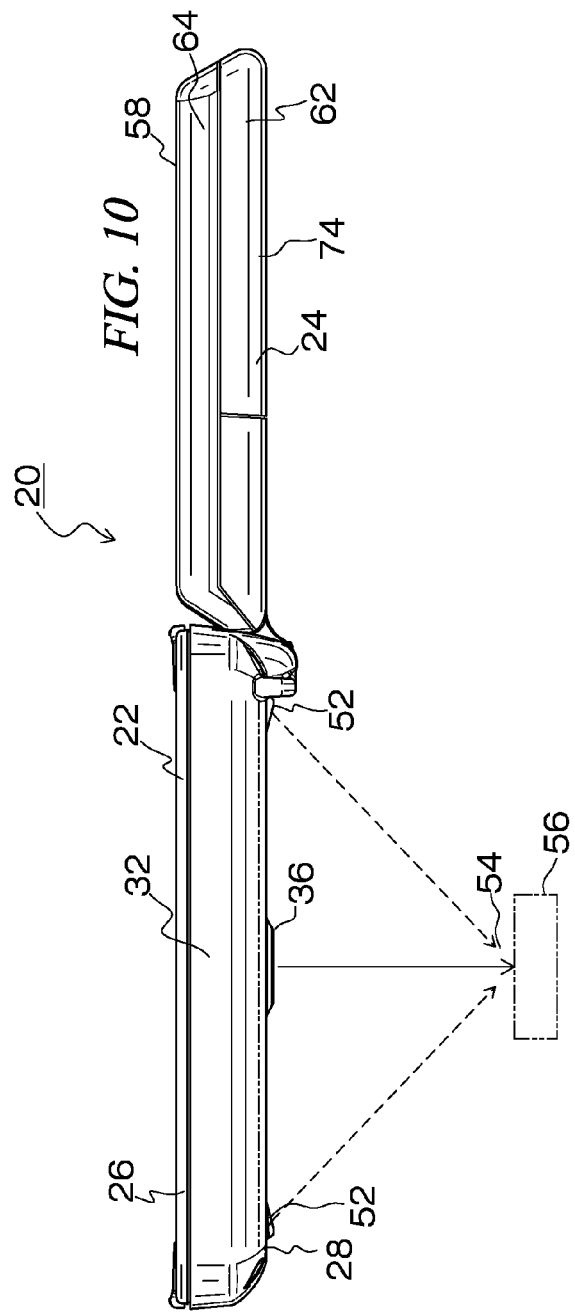

MULTIPOSITION HANDHELD ELECTRONIC MAGNIFIER

RELATED APPLICATION DATA

This is a continuation of co-pending application Ser. No. 12/478,993, filed Jun. 5, 2009, and entitled "Multiposition Handheld Electronic Magnifier", which is a continuation-in-part of co-pending application Ser. No. 12/235,182 filed on Sep. 22, 2008, and entitled "Portable Multi Position Magnifier Camera", which is a continuation of provisional application Ser. No. 61/085,966, filed on Aug. 4, 2008, and entitled "Portable Multi Position Magnifier Camera." The contents of all these applications are fully incorporated herein by reference.

BACKGROUND OF THE INVENTION

1. Field of the Invention

This invention relates to a magnification device for individuals with low vision. More particularly, the present invention relates to a handheld magnification device that has a variety of discrete configurations.

2. Description of the Background Art

The use of electronic magnifiers for low vision users is known in the art. To date, however, these magnifiers have been heavy, bulky, and cumbersome to use. Additionally, many of these magnifiers have only one mode of operation, a mode that requires the user to hold the device at a fixed distance above the object being viewed. Prior art magnifiers also suffer from lack portability, which is problematic for users who may need assistance viewing objects when they are away from a traditional magnifier.

What is needed, then, is a magnifier with multiple configurations and modes of operation, whereby a user can use the magnifier by either holding the device relative to the object or by placing the device upon the object itself. There is an additional need for a magnifier that allows users to interact with the object while it is being magnified. There is also a need in the art for a magnifier that is handheld and easily transportable.

The portable multi position magnifier camera of the present invention is directed at fulfilling these needs.

SUMMARY OF THE INVENTION

It is therefore one of the objectives of this invention to allow a user to configure a magnifier camera into one of a variety of viewing modes so as to optimize the viewing of different sized objects at differing distances.

It is another objective of this invention to provide a magnifier camera that can either be held in front of an object to be viewed or positioned upon the object to be viewed.

It is yet another objective of this invention to provide a magnifier camera that has is hand-held, compact, and readily transportable.

The foregoing has outlined rather broadly the more pertinent and important features of the present invention in order that the detailed description of the invention that follows may be better understood so that the present contribution to the art can be more fully appreciated.

Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is front plan view of the magnifier of the present invention.

FIG. 2 is a back plan view of the magnifier of the present invention.

FIG. 5 is a side view illustrating the various orientations of the magnifying apparatus.

FIG. 6 is a view of the magnifying apparatus in its first orientation.

FIG. 7 is a view of the magnifying apparatus in its third orientation.

FIG. 8 is a view of the magnifying apparatus in its second orientation.

FIG. 9 is a cross sectional view showing the internal light chamber of the handle.

FIG. 10 is a side view of the magnifier illustrating the light being directed to a focal point beneath the housing.

Similar reference characters refer to similar parts throughout the several views of the drawings.

PARTS LIST

Figure 3:
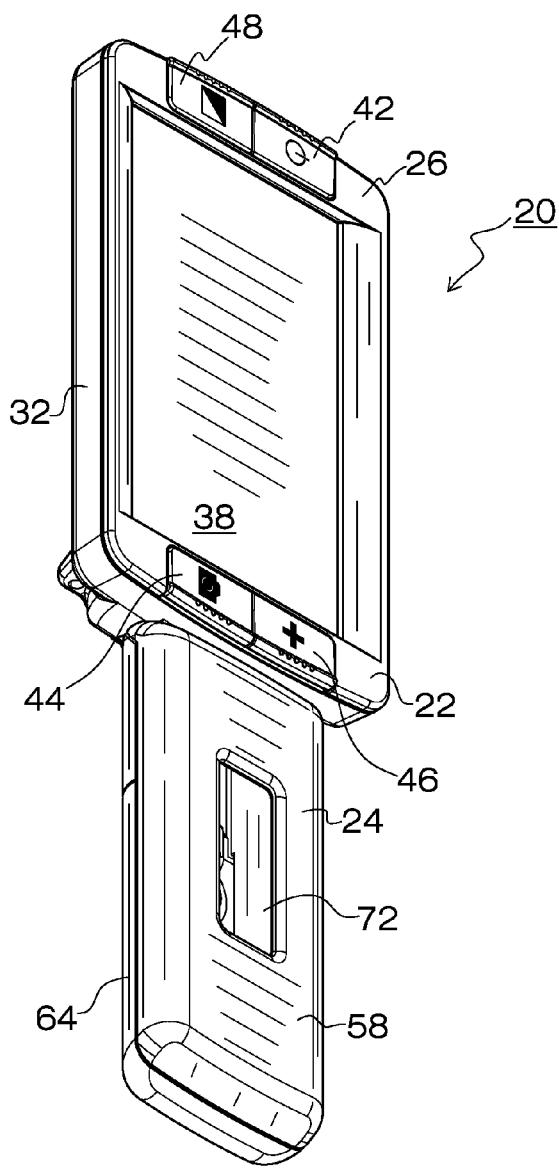
FIG. 3 is a perspective view of the front of the magnifying apparatus.

| | |
|---|---|
| 20 | Magnifier Device |
| 22 | Housing |
| 24 | Handle |
| 26 | Front Face (Housing) |
| 28 | Back Face (Housing) |
| 32 | Peripheral Edge (Housing) |
| 34 | Sensor |
| 36 | Aperture (Housing) |
| 38 | Screen |
| 42 | Power Button |
| 44 | Camera Button |
| 46 | Zoom Button |
| 48 | Mode Control Button |
| 52 | LEDs |
| 54 | Focal Point |
| 56 | Object Being Viewed |
| 58 | Front Face (Handle) |
| 62 | Back Face (Handle) |
| 64 | Peripheral Edge (Handle) |
| 66 | Aperture (Handle) |
| 68 | Light Guides (Handle) |
| 72 | Opening (Handle) |
| 74 | Battery Door |
| 76 | Batteries |
| 78 | Light Chamber |
| 82 | Angled Surfaces (Chamber) |
| 84 | Battery Compartments |

DETAILED DESCRIPTION OF THE PREFERRED EMBODIMENT

The present invention relates to a magnifier device for use by blind or low vision users. The magnifier includes a camera that can display enlarged images of target objects for viewing by the user. The magnifier device further includes a handle that is pivotally interconnected to a housing to thereby allow the device to be configured in a number of different configurations. The various features of the present invention, and the manner in which they interrelate, will be described in greater detail hereinafter.

With reference to FIGS. 1-4, the housing 22 and interconnected handle 24 of the magnifier 20 are illustrated. These components are preferably formed from an impact resistant plastic, such as an acrylonitrile butadiene styrene (ABS) plastic, or an equivalent thereof. Handle 24 and housing 22 are engaged with one another about an axis to thereby permit rotation of handle 24. As noted more fully hereinafter, magnifier 20 takes on various configurations based upon the angle of handle 24.

Housing 22 is defined by front and back faces (26 and 28, respectively) and an associated peripheral edge 32. With reference to FIG. 2, the camera for use with the magnifier is depicted. In the preferred embodiment, camera is a 3 megapixel CMOS sensor 34. Such sensors are commercially available and those of ordinary skill in the art will appreciate suitable equivalents thereto. With continuing reference to FIG. 2, it is seen that the sensor 34 includes an aperture that is aligned with an aperture 36 on the back face 28 of housing 22. The output from sensor 34 is supplied to a field programmable gate array (FPGA) and an image buffer. Additionally, images captured by sensor 34 can be stored in non-volatile memory to be recalled later by the user. The images can be processed by the imaging method described in commonly owned and co-pending application entitled "System and Method for Imaging Objects" (app. No. 61/099,185) filed on Sep. 22, 2008. The contents of this co-pending application are fully incorporated herein.

Stored images, or images currently viewed with sensor 34, can be displayed on screen 38. In the depicted embodiment, an LCD screen 38 is employed. Screen 38 is ideally recessed within front face 26 of housing 22. As such, a peripheral edge 32 is inwardly beveled. The LCD screen 38 is a full color video graphics array (VGA) display. Low-voltage differential signaling (LVDS) can be used to interconnect the LCD screen 38 to the FPGA and/or image buffer as noted above. This arrangement ensures a purely digital output on LCD screen 38 and also permits magnifier 20 to be used with an external monitor (not shown). Thus, by way of the LCD screen 38, objects within range of sensor 34 can be selectively displayed and digitally enlarged for the blind or low-vision user.

With reference to FIG. 1, the magnifier controls are illustrated. Controls are included for: power 42, camera/sensor 44, zoom 46, and mode 48. Power button 42 is used to turn the device 20 on and off. Camera button 44 is used to activate sensor 34 and also to take "snap shots" of the object being viewed. Depressing the control the first time activates sensor 34 such that the images within range are displayed on LCD screen 38. Depressing the control again captures the images and stores it in memory for later viewing. Zoom button 46 is used to change the magnification employed by sensor 34. For instance, by cycling zoom button 46, the user can select a suitable magnification level. In the preferred embodiment, magnification between 5× to 15× are possible. Finally, mode control 48 can be used to change the color combinations displayed upon screen 38. For instance, the screen can display objects in various color combinations, such as blue/green, red/yellow, or black/white. These color combinations can be cycled through until the user finds the mode effective output.

Light sources are also mounted to back face 28 of housing 22. In the preferred embodiment, these light sources are light emitting diodes (LEDs) 52. Other light sources, however, such as cold cathode fluorescent lamps (CCFLs) can alternatively be used. With particular reference to FIGS. 9 and 10, it can be seen that LEDS 52 are preferably mounted at an angle relative to the plane of housing 22. The depicted angle is approximately 45°. The back face 28 is raised about the LEDs 52 to thereby shield the LEDs 52 from damage. As illustrated, LEDs 52 are angled such that the emitted light emitting converges on a focal point 54. Preferably, focal point 54 is located at or near the object being viewed 56. LEDs 52 can be selectively illuminated depending upon ambient lighting conditions.

Figure 11:
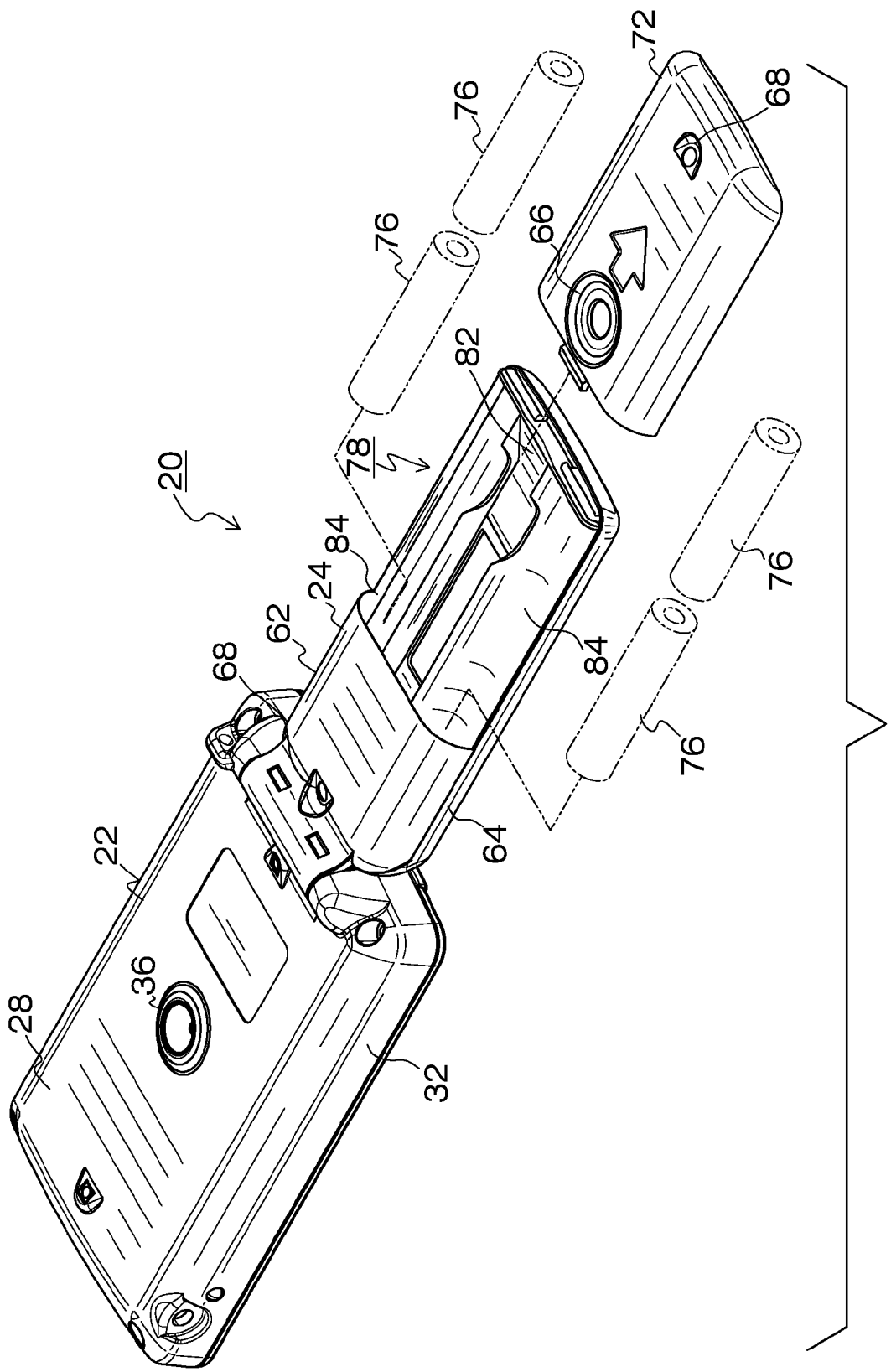
FIG. 11 is a perspective and partially exploded view of the magnifier camera with the battery cover removed.

With reference again to FIGS. 1-4, handle 24 of the device 20 is described. Handle 24 is defined by a front face 58, a back face 62, and a peripheral edge 64 therebetween. An aperture 66 and a pair of light guides 68 are formed within back face 62. Additionally, an opening 72 formed is within front face 58 and is positioned such that it is in alignment with aperture 66. As noted in FIG. 11, handle 24 further includes a battery door 74. The edges of battery door 74 are designed to slide into corresponding grooves within the peripheral edges 64 of handle 24. Door 74 serves to enclose batteries 76 that are positioned within handle 24 and which power device 20. In the depicted embodiment, four "AA" batteries 76 are used.

Figure 4:
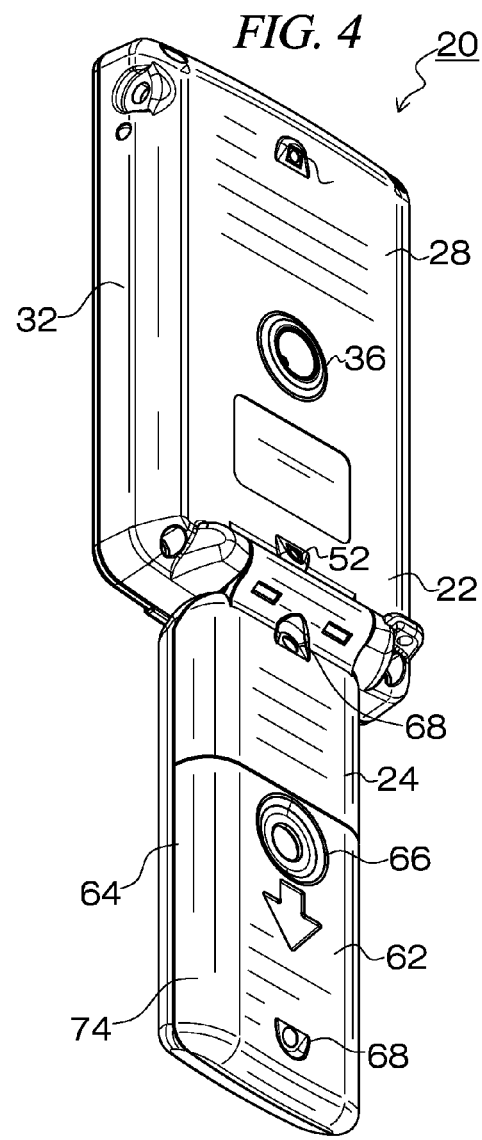
FIG. 4 is a perspective view of the back of the magnifying apparatus.

Handle 24 also includes an internal light chamber 78. Chamber 78 is most easily seen in the cross sectional view of FIG. 9. As described more fully hereinafter, light chamber 78 directs light from LEDs 52 to the object being viewed 56. One suitable light chamber is described in commonly owned U.S. Pat. No. 7,172,304 to Rodriguez et. al., the contents of which are fully incorporated herein. Whatever type of light chamber is utilized, it should include angled surfaces that are lightly colored to promote maximum light reflection and diffusion. In the preferred embodiment, light chamber 78 is white and includes angled surfaces 82 that are positioned immediately below light guides 68. With continuing reference to FIG. 4, it is seen that battery compartments 84 are positioned on either side of light chamber 78.

By pivoting handle 24 with respect to housing 22, magnifier 20 can be brought into a number of different orientations. The user can select the desired orientation for optimal viewing. The various magnifier orientations are described below in connection with FIGS. 5-8.

First Orientation

The first orientation of the magnifier 20 is depicted in FIG. 1. This orientation is defined by housing 22 and handle 24 being in alignment with one another. Namely, the angle between housing 22 and handle 24 is 180°, or approximately 180°. This orientation is preferred when magnifier 20 is used to view objects 56 at a distance or when the user otherwise does not need both hands free. In the orientation, the user holds magnifier 20 by grasping handle 24 and pointing sensor 34 at an object 56. The user's free hand can then be used to operate the controls to, for example, zoom in on the object (button 46), or take a snap shot (button 44). In this orientation, objects are viewed through the bottom of housing 22, while handle 24 is used to grasp the device 20.

Second Orientation

The second orientation of the magnifier 20 is depicted in FIG. 8. Here, handle 24 and housing 22 are positioned at an angle of less than 180°. In the depicted embodiment, housing 22 is positioned at a 90° angle relative to handle 24. When so configured, handle 24 can be positioned upon a surface, such as a table, and objects 56 can be placed in front of camera 34. Magnifier 20 can maintain this position because handle 24 is substantially heavier than housing 22 insomuch as handle 24 houses batteries. By positioning the device 20 on a table, the user is free to use both hands, as may be preferred if the object 56 needs to be manipulated in front of camera sensor 34. Thereafter, the user can utilize the controls to zoom in (button 46) and capture desired images (camera button 44).

Third Orientation

FIG. 7 illustrates the third orientation. Here, the back faces (28, 62) of the housing and handle (22, 24) are brought together, such that they are in facing relation to one another. In other words, the angle between housing 22 and handle 24 is 0°, or approximately 0°. This orientation is preferred when magnifier 20 is to be positioned directly over an object 56. This includes resting magnifier 20 directly upon a flat object 56 such as a document. In this configuration, sensor 34 is viewing the object through the aperture 36 in housing 22, as well as aperture and opening (66, 72) in handle 24. Furthermore, in the third orientation, the LEDs 52 are brought into registry with light guides 68 in handle 24. Thus, LEDs 52 direct light through light guides 68, into light chamber 78, and out through opening 72. In this manner, LEDs 52 can effectively illuminate the object being viewed 56.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A handheld magnifier to assist blind or low vision users in viewing objects, the magnifier comprising:
    a housing, a camera positioned within the housing, a light source positioned adjacent the camera, a screen positioned within the front face, the screen selectively displaying objects viewed by the camera;
    a handle pivotally connected to the housing, an opening and a light guide formed in the handle;
    a light chamber formed within the handle;
    whereby the handle can be folded onto the housing such that the camera is in registry with the handle opening, the light source is in registry with the light guide, and the light guide is in registry with the light chamber, thereby permitting objects to be viewed upon the screen with the handle and the housing brought together.

2. The magnifier as described in claim 1 wherein the light source is a pair of LEDs.

3. The magnifier as described in claim 1 wherein the light source is angled.

4. The magnifier as described in claim 1 wherein the handle houses a battery compartment.

5. The magnifier as described in claim 1 wherein the light chamber is formed from a light reflective material.

6. The magnifier as described in claim 1 wherein the light chamber includes an angled surface that is positioned immediately below the light source when the handle is folded onto the housing.

7. The magnifier as described in claim 1 wherein the magnifier has a first orientation wherein the housing and handle are in alignment, such that the handle can be held by a user to position the camera at a distance from an object being viewed, the magnifier having a second orientation wherein the handle and housing are angularly related, such that the handle can be positioned upon a surface and objects can be placed in front of the camera, the magnifier having a third orientation wherein the housing and handle are brought together.

8. A handheld magnifier comprising:
    a housing with front and back faces, the housing further including first and second ends and a midpoint therebetween, a camera positioned within the housing proximate the midpoint, a first light source positioned proximate the first end of the housing, a second light source position proximate the second end of the housing, an axis extending through the midpoint and perpendicular to the front and back faces, the first and second light sources being angled to direct light toward a focal point along the axis and below the back face, a screen positioned within the front face, the screen selectively displaying objects viewed by the camera;
    a handle pivotally connected to the housing, the handle having first and second ends and a midpoint therebetween, an opening formed proximate to the midpoint, a first light guide formed proximate to the first end, a second light guide formed proximate to the second end;
    a light chamber formed within the handle;
    whereby the handle can be folded into facing relation with the back face of the housing such that the camera is in registry with the handle opening, and the first and second light guides are in registry with the first and second light sources.

9. A handheld magnifier comprising:
    a housing, a camera positioned within the housing, a light source positioned adjacent the camera, a screen positioned within a front face, the screen selectively displaying objects viewed by the camera;
    a handle pivotally connected to the housing, an opening and a light guide formed in the handle;
    a light chamber formed within the handle;
    the magnifier having a first orientation wherein the housing and handle are in alignment, such that the handle can be held by a user to position the camera at a distance from an object being viewed, the magnifier having a second orientation wherein the handle and housing are angularly related, such that the handle can be positioned upon a surface and objects can be placed in front of the camera, the magnifier having a third orientation wherein the housing and handle are brought together, such that the handle can be positioned over top of the object being viewed to permit the camera to view objects through the camera aperture and handle opening and display objects on the screen, and whereby light from the light source is directed into the light guide and into the light chamber to thereby illuminate the object being viewed.

10. The magnifier as described in claim 9 wherein the light chamber includes an angled surface that is positioned immediately below the light source when in the third orientation.

* * * * *